United States Patent

Epper et al.

Patent Number: 5,282,780
Date of Patent: Feb. 1, 1994

[54] APPARATUS FOR SEPARATING SOLIDS/LIQUIDS MIXTURES WITH A SLURRY BYPASS

[75] Inventors: Wolfgang Epper, Bergheim; Reinhard Kluge, Bergisch-Gladbach, both of Fed. Rep. of Germany

[73] Assignee: Kloekner-Humboldt-Deutz AG, Fed. Rep. of Germany

[21] Appl. No.: 837,364

[22] Filed: Feb. 14, 1992

[30] Foreign Application Priority Data

Feb. 14, 1991 [DE] Fed. Rep. of Germany ....... 4104482

[51] Int. Cl.$^5$ .............................. B04B 13/00
[52] U.S. Cl. .......................... 494/1; 494/10; 494/29; 494/30; 494/53
[58] Field of Search ............ 494/1, 5, 10, 23, 35, 494/27-30, 37, 42, 43, 85, 50-56; 210/360.1, 380.1, 380.3, 143

[56] References Cited

U.S. PATENT DOCUMENTS

| 2,532,792 | 12/1950 | Svensjo ............................ 494/1 |
| 2,893,562 | 7/1959 | McPhee et al. .................. 210/380.3 |
| 2,928,546 | 3/1960 | Church ........................... 494/27 X |
| 2,961,154 | 11/1960 | Bergey ............................ 494/1 |
| 3,073,516 | 1/1963 | Glasson .......................... 494/27 |
| 3,228,594 | 1/1966 | Amero ............................ 494/23 |
| 3,532,264 | 10/1970 | Amero ........................... 494/53 X |
| 3,960,318 | 6/1976 | Dahlberg ......................... 494/27 |
| 3,967,778 | 7/1976 | Hunwick ......................... 494/29 |

FOREIGN PATENT DOCUMENTS

| 3536624 | 4/1987 | Fed. Rep. of Germany ........ 494/10 |
| 2045363 | 2/1987 | Japan .............................. 494/53 |
| 385627 | 9/1973 | U.S.S.R. . |
| 2253166 | 9/1992 | United Kingdom ............... 494/53 |

Primary Examiner—Stephen F. Gerrity
Assistant Examiner—Charles Cooley
Attorney, Agent, or Firm—Hill, Steadman & Simpson

[57] ABSTRACT

An apparatus for separating solids and liquid mixtures such as to form concentrated sludge including a solid bowl worm centrifuge which has a slurry admission inlet and outlets for a liquid fraction and for concentrated sludge. A detector for detecting the consistency of the sludge leaving the centrifuge, a conduit for bypassing slurry being supplied from a source to the centrifuge and a control valve for controlling the amount bypassed as a function of the consistency of the sludge fraction and in some instances also a conduit for feeding a dilution liquid to the sludge leaving the centrifuge.

8 Claims, 1 Drawing Sheet

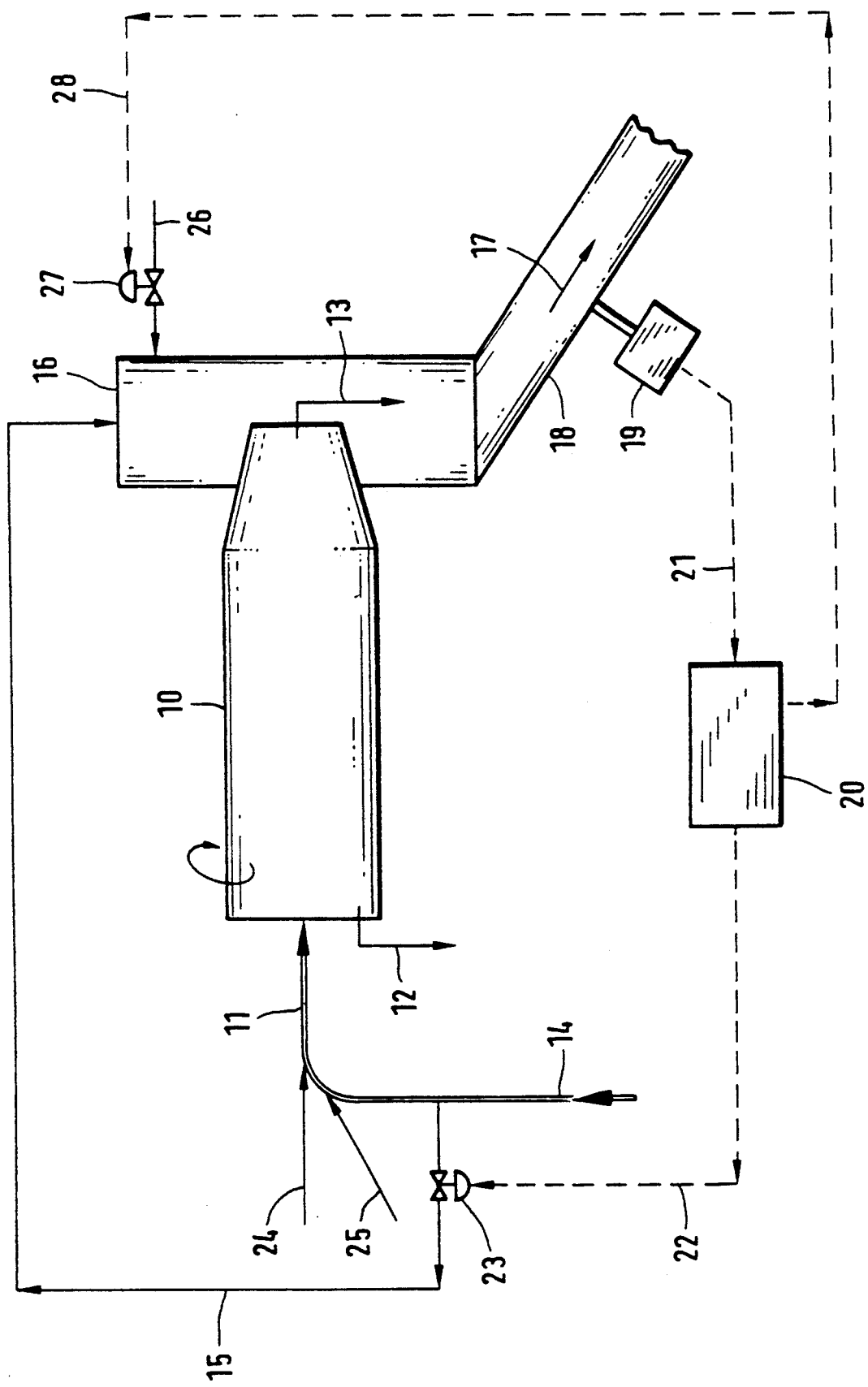

APPARATUS FOR SEPARATING SOLIDS/LIQUIDS MIXTURES WITH A SLURRY BYPASS

BACKGROUND OF THE INVENTION

The present invention relates to improvements in apparatus and methods for separating solids and liquid mixtures, particularly for thickening thin slurries to form a concentrated sludge.

The invention improvement includes a solid bowl worm centrifuge separator which has a slurry admission, an outlet for a liquid fraction and an outlet for discharge of the concentrated sludge. In such a mechanism, thin slurries having a solid content or dry matter content of approximately 0.5% through 1.5% by weight, are generally received commercially from the floor of settling basins. For example, such slurries are produced in the biological treatment stage of sewage treatment plants. The major part of these thin slurries, which are laced with microorganisms, are pumped back into the settling basins as returned slurry. The remaining thin slurry, which is the excess slurry, must be withdrawn and must be concentrated before being introduced into a sludge digestion container. This slurry thickening often occurs in static slurry thickeners in which the slurry solids slowly settle as sediment and has a consistency which permits it to be subsequently pumped into a sludge digestion container.

It has been proposed to thicken thin slurries such as the excess slurries in a solid bowl worm centrifuge for the purpose of enhancing the separating power or in other words increasing throughput performance. It has been shown, however, that in a high performance worm centrifuge, the thin slurries are thickened through a sludge discharge having a dry matter content on the order of magnitude of approximately 8% through 10%. This thickened sludge can no longer be pumped. It must be conveyed to the sludge digesting container by involved equipment or an involved way. The operators of clarification plants require a thickened excess slurry that can be pumped into the digestion container. Further, the throughput power of even slurry thickening centrifuges is limited.

It is, therefore, an object of the present invention to provide a method and apparatus which can use centrifugal separating apparatus for the thickening of thin slurries where the throughput capability is substantially enhanced.

A further object is to provide a centrifugal thickening apparatus and process wherein the operation is assured and guaranteed that the concentrated sludge is always pumpable even with the use of a high performance worm centrifuge.

FEATURES OF THE INVENTION

In an apparatus for practicing the invention utilizing centrifugal thickening of thin slurry, a part of the slurry input source is branched off in a bypass conduit past the centrifuge and led directly into a housing at the discharge of the centrifuge which receives concentrated sludge. This bypass slurry performs a dilution function on the dry matter coming from the centrifuge so that the dilution can act on the original dry matter which in a high performance centrifuge, is on the order of 8% through 10%. The dilution reduces the dry matter content to approximately 5% through 6%.

The thickened sludge that has been centrifugally produced has had its dry matter content altered so that it is suitable for being conveyed by a pump, such as a rotary pump, a piston pump, an eccentric worm pump, and other pumps utilized in a treatment of sludge.

The method and apparatus utilize the advantages of the separating power and the throughput performance of a high performance solid bowl worm centrifuge which can be fully utilized. The substream of thin slurry admission flowing through the bypass conduit and bypassing the centrifuge need not be accelerated in the centrifuge and also need not be laced with flocculent. This results in an energy saving as well as an elimination of the flocculent additive that may potentially have to be employed in the centrifuge. As a consequence of the bypass conduit, the throughput performance of the centrifugal thin slurry thickening is considerably enhanced on the order of 40%. This can be utilized in the remodeling and use of an existing centrifugal slurry thickening means or in the original planning of such an apparatus in a plant.

The centrifugal thin slurry thickening apparatus is distinguished by requiring low capital and operating costs in comparison to technical solutions which have heretofore been proposed wherein the dry matter content of the concentrated sludge discharged from the centrifuge would be regulated merely by adding a lesser or greater quantity of dilution water to the slurry admission of the centrifuge.

For setting the pumpability of the discharge of the concentrated sludge from the centrifuge, which is indicated as a consistency representative of pumpability, the concentrated sludge is measured such as by measurement of the flow rate. To this end, a sludge discharge housing is provided receiving the sludge fraction from the centrifuge and the housing is constructed to include an inclined chute. In the inclined chute is a detector for measuring the flow rate of the discharged sludge. This detector is connected to control means which feeds a control signal to a regulating valve in the bypass conduit. This, of course, controls the quantity of thin slurry flowing through the bypass conduit and controls the amount which is directly introduced into the sludge discharge housing. This is located in a region placed preceding the detector for the purpose of diluting the centrifugally concentrated sludge and for the purpose of enhancing the performance of the entire system. The subquantity of thin slurry admission flowing through the bypass conduit can be all the higher to allow for the dry matter content of the sludge discharge leaving the centrifuge so that the amounts fed through the centrifuge and the bypass can be relatively adjusted.

Other advantages and features will become more apparent with the teaching of the principles of the present invention in connection with the disclosure of the preferred embodiments thereof in the specification, claims and drawings, in which:

DESCRIPTION OF THE DRAWINGS

The single FIGURE of the drawing is a schematic showing of a separation system utilizing the principles of the present invention.

DESCRIPTION OF THE PREFERRED EMBODIMENT

The drawing shows schematically a solid bowl worm centrifuge 10. Such centrifuge is frequently designed having a cylindrical portion and a conical end. The cylindrical and conical portions provide the basket shell and within the shell is a conveyor worm which conveys the solids from the left to right as illustrated in the drawing and the worm normally is rotated at a differential speed relative to the rotational speed of the shell.

The worm centrifuge 10 has a slurry admission line 11 which usually is positioned at a central axial location. The shell is also provided with an outlet 12 for a liquid fraction of the separated slurry. The shell is also provided with a discharge outlet 13 for the thickened sludge fraction.

Thin slurry is supplied to the centrifugal separator from a slurry source 14 and such slurry will normally have a dry matter content in the range of 0.5% through 1.5%. In a slurry source, such as referred to above, excess slurry from a biological treatment stage of a sewage treatment plant will be concentrated in the centrifuge 10. The liquid fraction flowing through the outlet 12 will have a dry matter content such as on the order of 0.1% and this can be pumped back to the settling basin of the biological treatment stage.

A substream is branched off from the admission of the thin slurry at 14 through a bypass conduit 15. This bypass slurry is introduced directly into a sludge discharge housing 16 located to receive the heavy fraction discharge at 13. Thus, the bypass slurry flowing through the conduit 15 bypasses the centrifuge 10.

As a result, the dilution of the sludge which exits from the centrifugal separator at 13 is obtained. The original dry matter content of the concentrated sludge at 13 is reduced on the order of magnitude from what is initially approximately 8% through 10% to values of between approximately 5% through 6%. As a result of this dilution, the concentrated sludge which flows as shown by the arrowed line 17 down through an inclined chute 18 is pumpable with this limited solids content. What has been simultaneously achieved as a consequence of the bypass conduit 15 is that a considerably greater quantity of incoming thin slurry 14 can be practically treated.

Representative of the pumpability of the concentrated solid 17, the flow rate on the inclined chute 18 is measured by a detector 19. This detector is connected by a processor or control means 20 which receives the flow rate signal from the detector 19 and is connected to a control valve 23 through a line 22. The signal from the detector is supplied through a line 21. A regulating valve 23 is arranged in the bypass conduit 15 and controls the subquantity of slurry which flows through the bypass conduit 15. Care is exercised to see that the control valve 23 is always situated so that it will not be accidentally completely closed and the control valve will always remain open to a greater or lesser extent, this simultaneously preventing the risk of blockage of the control valve. Thus, the control valve is provided with a limiting means which sets the minimum closure amount so that there is always a trickling flow of bypass slurry.

In some instances, a flocculent dosing conduit 24 can be provided to discharge into the slurry admission conduit 11. Also, a conduit 25 may be provided for supplying additional dilutant water. The flocculent dosing at 24 can be regulated dependent on or interrelated to the solid content of the liquid fraction 12 or the solids throughput (volume stream times density) of the slurry admission 11.

In addition to or potentially as an alternative to the bypass conduit 15, a conduit 26 can be provided for introducing dilutant water or rinse water. This is connected to the housing 16 of the centrifuge 10 and is provided with a control valve 27. The control valve can additionally be controlled by the control box 20 through a signal line 28. This, of course, receives its operating signal from the detector 19 which measures the flow rate of the discharged concentrated sludge 17.

Thus, it will be seen that there has been provided an improved process and apparatus for concentrating sludge and which provides an output which will assuredly be pumpable. This is done utilizing the efficiency of centrifugal separators and, in fact, increases the total efficiency of the entire system as set forth.

We claim as our invention:

1. An apparatus for separating solids and liquid mixtures from slurries to form a concentrated sludge comprising in combination:
   a worm centrifuge for separating a slurry into a sludge fraction and a liquid fraction;
   a slurry inlet leading into the centrifuge supplying slurry thereto to be separated;
   a liquid fraction outlet leading from the centrifuge;
   a sludge outlet leading from the centrifuge;
   a slurry bypass conduit leading from said slurry inlet to said sludge outlet;
   and a detector for measuring a flow rate of sludge at said sludge outlet, said detector being connected by a control means to a control element in said bypass conduit, said control element regulating a quantity of slurry to be directed through said bypass conduit to said sludge outlet, so that a dry matter proportional content of the sludge at said sludge outlet is reduced for conveyance of the sludge fraction.

2. An apparatus for separating solids and liquid mixtures from slurries to form a concentrated sludge constructed in accordance with claim 1:
   wherein said control element comprises a slurry flow control valve for controlling the amount of slurry flowing through said bypass conduit;
   and said control means is connected to said detector and to said valve for controlling the flow through said bypass conduit as a predetermined function of a flow signal furnished by said detector.

3. An apparatus for separating solids and liquid mixtures from slurries to form a concentrated sludge constructed in accordance with claim 1:
   including a flocculent dosing conduit connected to the slurry inlet for mixing flocculent with slurry delivered to the slurry inlet of the separator.

4. An apparatus for separating solids and liquid mixtures from slurries to form a concentrated sludge constructed in accordance with claim 1:
   including a conduit for dilutant water connected to the sludge outlet.

5. An apparatus for separating solids and liquid mixtures from slurries to form a concentrated sludge comprising in combination:
   a worm centrifuge for separating a slurry into a sludge fraction and a liquid fraction;
   a slurry inlet leading into the centrifuge supplying slurry thereto to be separated;
   a liquid fraction outlet leading from the centrifuge;
   a sludge outlet leading from the centrifuge;
   a slurry bypass conduit leading from said slurry inlet to said sludge outlet so that a dry matter proportional content of the sludge at said sludge outlet is reduced for conveyance of the sludge fraction;

a chute connected to said sludge outlet for the discharge of concentrated sludge and being obliquely inclined relative to an axis of rotation of the centrifuge;

and a detector for measuring a flow rate of sludge flowing from the sludge outlet and providing a signal representative of pumpability of the discharged concentrated sludge flowing from the sludge outlet to said chute.

6. An apparatus for separating solids and liquid mixtures from slurries to form a concentrated sludge comprising in combination:

a worm centrifuge for separating a slurry into a sludge fraction and a liquid fraction;

a slurry inlet leading into the centrifuge supplying slurry thereto to be separated;

a liquid fraction outlet leading from the centrifuge;

a sludge outlet leading from the centrifuge;

a slurry bypass conduit leading from said slurry inlet to said sludge outlet so that a dry matter proportional content of the sludge at said sludge outlet is reduced for conveyance of the sludge fraction;

a sludge discharge housing connected to said sludge outlet to receive sludge from said sludge outlet;

said bypass conduit connected to said housing;

a dilutant water conduit leading to said housing;

means for controlling the flow of slurry through said bypass conduit;

and means for controlling the flow of water through the water conduit.

7. An apparatus for separating solids and liquid mixtures from slurries to form a concentrated sludge comprising in combination:

a worm centrifuge for separating a slurry into a sludge fraction and a liquid fraction;

a slurry inlet leading into the centrifuge supplying slurry thereto to be separated;

a liquid fraction outlet leading from the centrifuge;

a sludge outlet leading from the centrifuge;

a slurry bypass conduit leading from said slurry inlet to said sludge outlet so that a dry matter proportional content of the sludge at said sludge outlet is reduced for conveyance of the sludge fraction;

a dilutant water conduit connected to said sludge outlet;

first valve means for controlling the flow of slurry through said bypass conduit;

second valve means for controlling the flow of dilutant water through the dilutant water conduit;

a detector located in said sludge outlet upstream of a location where the dilutant water conduit and slurry bypass conduit join the sludge outlet, said detector controlling said first and second valve means as a predetermined function of the consistency of sludge at said outlet.

8. An apparatus for separating solids and liquid mixtures from slurries to form a concentrated sludge comprising in combination:

a solid bowl worm centrifuge rotatable about an axis for separating a slurry into a sludge fraction and a liquid fraction;

a slurry source connected to deliver a slurry to an axial slurry inlet on the centrifuge;

a liquid fraction outlet leading from the centrifuge;

a sludge outlet leading from the centrifuge to a sludge housing;

a sludge discharge chute obliquely inclined relative to the bowl axis leading from the housing;

a detector in said chute measuring pumpability of the sludge in the chute and providing an output signal;

a bypass conduit extending between the slurry source and the sludge housing;

a dilution water conduit connected to said sludge housing;

a water control valve in said water conduit;

a slurry flow valve in the bypass conduit;

a controller connected to receive said output signal from said detector and connected to said valves for providing a controlled supply of slurry and dilution water to said housing to obtain a predetermined pumpability consistency of the sludge.

* * * * *